United States Patent [19]

Haché et al.

[11] Patent Number: 5,429,716
[45] Date of Patent: Jul. 4, 1995

[54] PROCESS FOR DE-INKING RECYCLED PAPER PULP WITH A REDUCING AGENT

[75] Inventors: Maurice Haché, Lynn, Mass.; Sheri Prosperi, Itasca, Ill.

[73] Assignee: Morton International, Inc., Chicago, Ill.

[21] Appl. No.: 83,732

[22] Filed: Jun. 28, 1993

[30] Foreign Application Priority Data

Jul. 2, 1992 [GB] United Kingdom ............... 9214041

[51] Int. Cl.$^6$ .......................... D21C 5/02; D21C 3/12
[52] U.S. Cl. .......................................... 162/7; 162/8
[58] Field of Search ................. 162/7, 80, 83, 8

[56] References Cited

U.S. PATENT DOCUMENTS 4,390,395  6/1983  DeCeuster et al. ................. 162/7

FOREIGN PATENT DOCUMENTS

| 719622 | 10/1965 | Canada ................. 162/7 |
| 2008678 | 7/1990 | Canada ................. 162/7 |
| 0374057 | 11/1989 | European Pat. Off. . |
| 3118192 | 5/1981 | Germany . |
| 3309956 | 3/1983 | Germany . |
| 36362 | 10/1976 | Japan ................. 162/7 |

Primary Examiner—Karen M. Hastings
Attorney, Agent, or Firm—Mark F. LaMarre; Charles N. Lovell; Gerald K. White

[57] ABSTRACT

Recycled paper pulp is de-inked by pulping it at neutral or alkaline pH with an aqueous deinking composition comprising one or more reducing agents. The preferred reducing agents are sodium bisulfite and sodium borohydride. Sodium hydroxide is preferably used to give the desired pH.

9 Claims, 4 Drawing Sheets

PROCESS FOR DE-INKING RECYCLED PAPER PULP WITH A REDUCING AGENT

BACKGROUND OF THE INVENTION

1. Field of the Invention

This invention relates to a process for deinking pulp made from recycled paper such as newsprint.

The volume of printed paper recycled to make other paper products has greatly increased in recent years, as environmental and economic considerations have caused the industry to reduce the amount of virgin wood pulp used in papermaking.

2. Description of the Prior Art

In order to improve the appearance of paper made by recycling newsprint, magazines and the like, the recycled pulp is usually treated with chemicals to release ink particles from the fibres. Hitherto, deinking has been carried out by an oxidative process, the most commonly used oxidizing agent being hydrogen peroxide at alkaline pH. Ink particles may also be trapped using chelating agents. Separated ink particles can then be removed from the pulp for example by flotation.

SUMMARY OF THE INVENTION

The present invention aims to provide a process for deinking paper pulp which gives brightness gains comparable to those obtained by conventional oxidative processes, but using reagents which are cheaper and/or more readily available to the papermaking industry.

According to the present invention, recycled paper pulp is deinked by treating it at neutral or alkaline pH with an aqueous deinking composition comprising one or more reducing agents preferably sodium borohydride and/or bisulfite. The composition preferably contains an alkali, most preferably sodium hydroxide. A preferred reductive deinking composition comprises a mixture of sodium bisulfite, sodium hydroxide and an aqueous mixture of sodium borohydride and sodium hydroxide such as that sold by Morton International Inc under the trademark BOROL. This aqueous solution comprises, by weight, 12% $NaBH_4$, 48% NaOH and 40% water.

Preferred deinking compositions for use in the process of the invention comprise, by weight, 0.3 to 0.8% Borol, 0.7 to 2.0% sodium bisulfite and 0.2 to 0.7% sodium hydroxide, most preferably about 0.5% Borol, about 1.3% sodium bisulfite and about 0.4% NaOH. The weight ratio of bisulfite to borohydride in such a composition is about 8:1, and generally this ratio should preferably be in a range of 6:1 to 16:1, more preferably 7:1 to 10:1 since higher ratios tend not to give improvements in brightness commensurate with the increased cost.

The pulp may be of low or medium consistency, for example from 2 to 15%. The compositions of the invention have been found to give good brightness gains both at low consistencies such as 4% and at medium consistencies such as 12%. In particular, a whiter pulp [i.e. lower yellow-blue (b*) axis values] can be obtained than is generally achieved by conventional oxidative deinking.

The combination of Borol, sodium bisulfite and sodium hydroxide has been found to exhibit a synergistic effect, and it is thought that this is due to the in situ generation of sodium hydrosulfite, $Na_2S_2O_4$. Therefore, according to a further embodiment of the invention sodium hydrosulfite is used as the reducing agent for deinking recycled pulp. This embodiment has been found to work best at low pulp consistency, as will be discussed below. The preferred content of sodium hydrosulfite is 0.4 to 2.0 weight %, more preferably up to 1.5 weight %. Another reducing agent which may be used is formamidine sulfinic acid (FAS), preferably in an amount of 0.4 to 2.0 weight %.

The invention will be further illustrated by the following examples, which detail reductive deinking trials in accordance with the invention as well as comparative trials using an oxidative process, and with reference to the accompanying drawings.

DETAILED DESCRIPTION OF THE PREFERRED EMBODIMENTS

Figure 1:
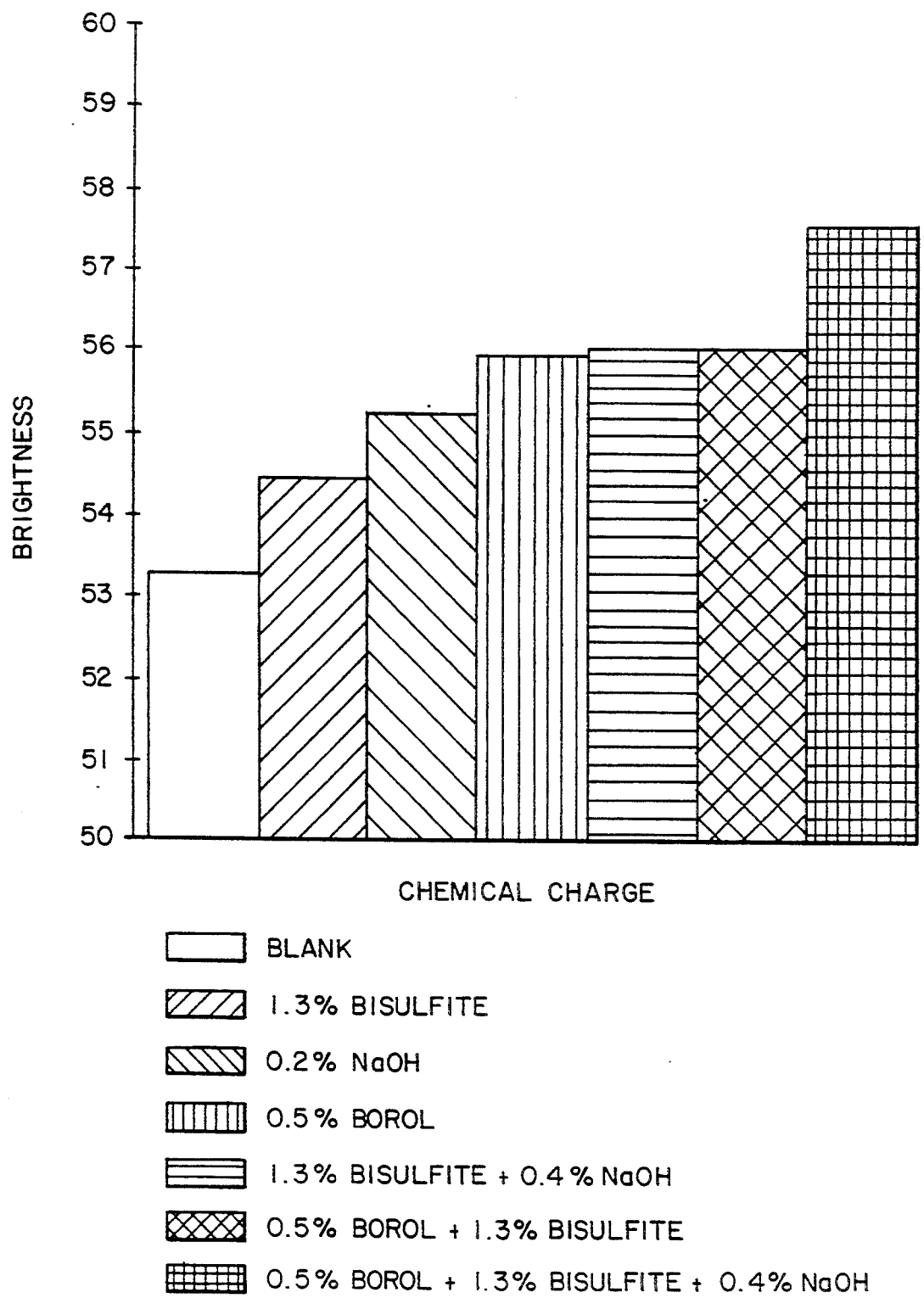
FIG. 1 is a bar chart showing the brightness gains achieved with different chemical changes in Examples 1 to 3.

The following experimental details apply to all the examples:

1. Deinking chemicals

Aqueous solutions were made up as follows, on a % W/W basis by diluting with deionised water:
a) Reductive processes:
  i) Borol, NaOH and $NaHSO_3$, at concentrations indicated
  ii) NaOH and $Na_2S_2O_4$ generated from Borol, NaOH and $SO_2$, also at concentrations indicated and
  iii) Formamidine sulfinic acid (FAS) 1.0% and NaOH 0.4%.
b) Oxidative process (comparative):
Diethylenetriamine pentaacetic acid (DTPA) 1% as solution

| Sodium silicate | 10% |
| --- | --- |
| Sodium hydroxide | 10% |
| Hydrogen peroxide | 4% |

The hydrogen peroxide strength was determined daily with a standard iodometric titration. All the solutions were made and stored at room temperature with the exception of the soap solution which was made as follows: 5 grams of soap was added to 45 grams of water. This was heated to 60°–70° C. for 10 minutes making sure not to exceed 70° C., until all the soap was dissolved. The soap solution was then stored at 50° C. The soap solutions had to be made fresh daily and discarded at the end of the day.

2. Pulp Preparation

The pulp was a blend of 70% newsprint and 30% magazines. The newsprint furnish was predominantly the Boston Globe and the Lawrence Eagle Tribune newspapers which were anything from 6 to 18 months old. The magazine furnish was sourced from 10 different magazines from 1 to 3 months old.

Each was shredded separately using an electric shredder. Bags of 100% newsprint or magazine and blends of these two were prepared by placing 120 g oven dried (O.D.) (133 g wet), for 12.0% consistency, or 30 g O.D. (33.3 g wet) for 4.0% consistency in each bag assuming 10% moisture.

3. Pulping Procedure

For 12.0% consistency pulping:

A. The pulping was done in a Model N-50 Hobart mixer.

B. The bowl was heated to 50° C. with water then thoroughly dried.

C. 133 g wet (120 g O.D.) pulps (paper) was placed in the bowl making sure the paper pieces were well separated.

D. A heating mantle was used to keep the temperature at 50° C.

E. A liquor mixture was prepared by adding the chemicals to 870 mL of deionized water at 50°–55° C.

F. The liquor mixture was then added to the pulper.

G. Then 0.8% soap was added which gave a final pulp consistency of 12.0%.

H. The pulp was mixed on the first speed for 5 minutes then on second speed for 25 minutes for a total pulping time of 30 minutes. While mixing the bowl was covered to prevent heat loss.

I. When completed the pH and temperature of the pulp was recorded.

J. At this point the pulp was a very dark grey with a distinct orange to yellow tinge.

K. Handsheets were made from the pulp with no pH adjustment and labelled pulper brightness.

4. for 4.0% Consistency Pulping

A. The pulping was done in a Waring commercial blender.

B. 33.3 g wet (30 g O.D.) pulp (paper) was placed in the blender making sure the paper pieces were well separated.

C. 700 mL of deionized water at 50°–55° C. along with 0.8% soap was added to the paper in the blender.

D. This was mixed for several seconds after which the liquor mixture was added.

E. The pulp was then mixed at high speed for 3 minutes.

F. When done mixing the pH of the pulp slurry was recorded.

G. At this point the pulp was a very dark grey with distinct spots of ink.

H. The pulp was then either immediately floated or put in a bag, sealed with nitrogen for the specified hold time.

5. Flotation Procedure

The water used for flotation when a soap is used as the collector chemical must be hard. The optimum hardness is in the range of 200–240 ppm Ca. Water of such a hardness was prepared in bulk beforehand by adding $CaCl_2$ to deionized water and stored in a 55° C. bath until needed.

A. 333 g wet pulp (40 g O.D.) for 12.0% consistency or 750 g wet pulp (30 g O.D.) for 4.0% consistency from the pulper was placed in the 4 liter Wemco flotation cell.

B. 400 mL of hard water at 45° C. was then added to the pulp for a flotation consistency of 1%.

C. This pulp slurry was then mixed for 1 minute at 1200 RPM.

D. The pH of the slurry was then adjusted to 8.6.

E. Then the rotor and air flow was started which created a froth which was manually skimmed off. The water level and temperature was maintained by adding fresh hard water to the flotation cell as needed.

F. During flotation the froth removed contained distinct black ink particles. When magazines were part of the furnish the white carbonate based fillers were also distinctly seen in the froth. The pulp left in the flotation cell was now a much lighter grey than that obtained from the pulping stage.

G. After 10 minutes the mixing and air flow was stopped.

H. Handsheets were made with no pH adjustment and labelled flotation brightness.

6. Washing Procedure

A sample of the floated pulp was placed in a 60 wire mesh sieve for washing. Washing was done with tap water by forcing a stream of water over the pulp and at the same time allowing the sieve to fill up. Then the pulp was allowed to drain. This procedure was repeated three times. There was very little difference in the appearance of the pulp at the stage compared to that from the flotation stage. Pulp from this stage was made into handsheets as per the following procedure.

7. Procedure and Evaluation

Pulp taken from the final washing step above, were made into handsheets the same way as the other handsheets from the other stages with the exception that this pulp was adjusted to pH 5.5 with sulfuric acid. This pH adjustment of handsheets for deinked pulps is very important as some colloidally suspended ink particles precipitate and increase the brightness of the pulp up to 1.0 brightness point. These handsheets were labelled flotation/wash/shock. (The term shock is used by the industry to describe the precipitation of colloidal ink particles resulting from pH adjustment from alkaline to acid). The handsheets were then pressed, dried and brightness and L*a*b* determinations were made.

EXAMPLE 1

Pulp samples at 4% and 12% consistency were each deinked with the compositions shown in table 1 below, in accordance with the procedure described above. The pulping time was three minutes in each case for the 4% samples and 30 minutes in each case for the 12% samples.

The results in terms of ISO brightness are shown in Table 1, which also gives an indication of the cost of deinking chemicals per ton of pulp (O.D.) in US dollars at 1991 prices.

TABLE 1

| | Cons. % | Time (min.) | Bright. % ISO | Chemical Cost/Ton (1991) US$ |
|---|---|---|---|---|
| 0.5% Borol | 4 | 3 | 56.0 | 8.80 |
| 1.0% FAS + 0.4% NaOH | 4 | 3 | 55.2 | 49.28 |
| 0.5% Borol + 1.3% BIS + 0.4% NaOH | 4 | 3 | 57.6 | 16.32 |
| 2.1% Borol + 5.1% BIS + 1.2% NaOH | 4 | 3 | 59.6 | 65.28 |

TABLE 1-continued

|  | Cons. % | Time (min.) | Bright. % ISO | Chemical Cost/Ton (1991) US$ |
|---|---|---|---|---|
| 1.2% Borol | 12 | 30 | 46.0 | 21.12 |
| 1.0% FAS + 0.4% NaOH | 12 | 30 | 48.8 | 49.28 |
| 0.5% Borol + 1.3% BIS + 0.4% NaOH | 12 | 30 | 50.5 | 16.32 |
| 2.1% Borol + 5.1% BIS + 1.2% NaOH | 12 | 30 | 52.5 | 65.28 |

It can be seen from Table 1 that the greatest brightness gain, for both pulp consistencies, is obtained with 2.1% Borol (corresponding to 0.252% NaBH$_4$), 5.1% bisulphite and 1.2% NaOH. This is however expensive in view of the large amount of the three chemicals used, and a satisfactory brightness gain is obtained in each case with 0.5% Borol, (0.06% NaBH$_4$), 1.3% bisulphite and 0.4% NaOH, which gives a larger gain than is obtained with the much more expensive FAS.

EXAMPLE 2

Further tests were carried out on the two pulps, to compare the effect of the preferred 3-component deinking composition of the present invention with that obtained by each of its individual components, in varying quantities, and combinations thereof. The results obtained using Borol alone are shown in Table 2A.

TABLE 2A

| BOROL % | CON- SIS. % | PULP TIME min | PUL- PER pH | BRIGHT % ISO | L* | a* | b* |
|---|---|---|---|---|---|---|---|
| 0.1 | 4 | 3 | 7.2 | 54.1 | 81.7 | −0.5 | 6.4 |
| 0.3 | 4 | 3 | 8.2 | 55.7 | 82.4 | −0.5 | 6.1 |
| 0.5 | 4 | 3 | 8.9 | 56.0 | 82.3 | −0.6 | 5.4 |
| 0.6 | 4 | 3 | 9.1 | 55.1 | 81.7 | −0.4 | 5.7 |
| 0.8 | 4 | 3 | 9.6 | 55.8 | 82.4 | −0.4 | 5.8 |
| 1.0 | 4 | 3 | 10.1 | 55.8 | 82.2 | −0.3 | 5.9 |
| 1.2 | 4 | 3 | 10.2 | 55.9 | 82.6 | −0.2 | 6.2 |
| 1.4 | 4 | 3 | 10.6 | 55.6 | 82.6 | −0.2 | 6.4 |
| 1.2 | 12 | 30 | 9.2 | 46.0 | 75.5 | 0.1 | 3.8 |
| 1.4 | 12 | 30 | 9.3 | 44.3 | 74.2 | 0.1 | 3.7 |
| 1.8 | 12 | 30 | 9.6 | 44.9 | 74.6 | 0.0 | 3.3 |
| 2.2 | 12 | 30 | 9.7 | 46.5 | 76.5 | 0.1 | 4.9 |

The results obtained in using sodium bisulphite and/or sodium hydroxide, without Borol, are shown in Table 2B.

TABLE 2B

| BISULF- ITE % | NaOH % | PULPER pH | CON- SIS. % | PULPING TIME (min.) | BRIGHT. % ISO |
|---|---|---|---|---|---|
| 1.3 | 0.0 | 5.8 | 4 | 3 | 54.5 |
| 1.3 | 0.2 | 6.9 | 4 | 3 | 55.9 |
| 1.3 | 0.4 | 7.5 | 4 | 3 | 56.1 |
| 1.3 | 0.6 | 8.2 | 4 | 3 | 56.2 |
| 1.3 | 0.8 | 9.3 | 4 | 3 | 56.2 |
| 0.0 | 0.2 | 8.7 | 4 | 3 | 55.3 |
| 0.0 | 0.4 | 10.0 | 4 | 3 | 54.5 |
| 0.0 | 0.6 | 10.6 | 4 | 3 | 54.2 |
| 0.0 | 0.8 | 11.0 | 4 | 3 | 54.1 |

EXAMPLE 3

Further tests were carried out, using both pulps, varying in turn the content each of the components of the Borol/bisulphite/NaOH system. In particular, the amount of NaOH was varied from 0 to 2.0%, varying the pH over a range from 5.2 to 10.5. The results are shown in Table 3.

TABLE 3

| BOROL % | BISUL % | NaOH % | PULPER pH | CON % | TIME (min) | BRIGHT % ISO | L* | a* | b* |
|---|---|---|---|---|---|---|---|---|---|
| 0.0 | 0.0 | 0.0 | 5.6 | 4 | 3 | 53.3 | 80.8 | −0.6 | 5.6 |
| 0.0 | 0.0 | 0.2 | 8.7 | 4 | 3 | 55.3 | 82.4 | −0.4 | 6.1 |
| 0.0 | 1.3 | 0.0 | 5.8 | 4 | 3 | 54.5 | 81.3 | −0.4 | 5.1 |
| 0.0 | 1.3 | 0.4 | 7.5 | 4 | 3 | 56.1 | 82.6 | −0.6 | 5.9 |
| 0.5 | 1.3 | 0.0 | 6.8 | 4 | 3 | 56.1 | 82.4 | −0.7 | 5.6 |
| 0.5 | 1.3 | 0.2 | 7.5 | 4 | 3 | 56.8 | 82.8 | −0.8 | 5.8 |
| 0.5 | 1.3 | 0.4 | 8.4 | 4 | 3 | 57.6 | 83.0 | −0.7 | 5.5 |
| 0.5 | 1.3 | 0.6 | 9.4 | 4 | 3 | 57.5 | 83.4 | −0.6 | 5.8 |
| 0.5 | 1.3 | 0.8 | 10.1 | 4 | 3 | 57.3 | 83.2 | −0.4 | 6.1 |
| 0.5 | 1.3 | 1.0 | 10.5 | 4 | 3 | 56.5 | 83.2 | −0.2 | 6.7 |
| 0.5 | 1.3 | 0.0 | 6.0 | 12 | 30 | 45.3 | 74.5 | −0.3 | 3.0 |
| 0.5 | 1.3 | 0.2 | 7.2 | 12 | 30 | 48.1 | 76.7 | −0.5 | 3.8 |
| 0.5 | 1.3 | 0.4 | 8.1 | 12 | 30 | 50.5 | 78.3 | −0.3 | 4:1 |
| 0.5 | 1.3 | 0.6 | 8.8 | 12 | 30 | 50.5 | 78.8 | −0.5 | 4.8 |
| 0.5 | 1.3 | 0.8 | 9.2 | 12 | 30 | 48.8 | 77.7 | −0.3 | 4.7 |
| 0.5 | 1.3 | 1.0 | 9.4 | 12 | 30 | 48.5 | 77.4 | −0.5 | 4.5 |
| 0.5 | 1.3 | 1.4 | 9.9 | 12 | 30 | 46.4 | 76.1 | −0.3 | 4.7 |
| 2.1 | 5.1 | 1.2 | 9.0 | 4 | 3 | 59.6 | 84.6 | −0.4 | 6.5 |
| 2.1 | 5.1 | 0.0 | 5.2 | 12 | 30 | 47.3 | 76.0 | −0.5 | 3.2 |
| 2.1 | 5.1 | 1.0 | 7.7 | 12 | 30 | 50.5 | 78.6 | −0.3 | 4.6 |
| 2.1 | 5.1 | 1.2 | 8.4 | 12 | 30 | 52.5 | 79.7 | −0.5 | 4.2 |
| 2.1 | 5.1 | 1.4 | 8.9 | 12 | 30 | 50.8 | 78.8 | −0.5 | 4.9 |
| 2.1 | 5.1 | 1.6 | 9.2 | 12 | 30 | 51.2 | 79.0 | −0.5 | 4.3 |
| 2.1 | 5.1 | 1.8 | 9.4 | 12 | 30 | 48.2 | 77.5 | −0.4 | 4.8 |
| 2.1 | 5.1 | 2.0 | 9.6 | 12 | 30 | 48.0 | 77.0 | −0.3 | 4.0 |

Here it can again be seen that the preferred systems of Example 1 give a brightness gain not matched by any other combination of the three components. Key results from Examples 1 to 3 are illustrated by the bar chart of FIG. 1. The increase of 1½ ISO brightness points obtained by the preferred 3-component composition of the invention over the best results obtained with two-component systems strongly suggests a synergistic effect due to the in situ generation of sodium hydrosulphite.

EXAMPLE 4 optimum times (see Example 6 below). The results are shown in Table 5:

TABLE 5

| HYDRO % | NaOH % | PULPER pH | CONS. % | TIME min. | BRIGHT. % ISO | L* | a* | b* |
|---|---|---|---|---|---|---|---|---|
| 1.0 | 0.00 | 5.9 | 4 | 3 | 54.3 | 81.6 | −0.1 | 6.2 |
| 1.0 | 0.40 | 7.5 | 4 | 3 | 56.9 | 82.8 | −0.6 | 5.8 |
| 1.0 | 0.53 | 7.9 | 4 | 3 | 58.2 | 83.8 | −0.9 | 5.9 |
| 1.0 | 0.60 | 8.2 | 4 | 3 | 58.1 | 83.4 | −0.9 | 5.5 |
| 1.0 | 0.67 | 8.6 | 4 | 3 | 57.0 | 83.0 | −0.6 | 5.7 |
| 1.0 | 0.60 | 7.6 | 4 | 3 | 57.4 | 82.8 | −0.8 | 5.3 |
| 0.8 | 0.60 | 7.8 | 4 | 3 | 57.7 | 83.1 | −0.8 | 5.5 |
| 0.6 | 0.60 | 8.4 | 4 | 3 | 57.6 | 83.4 | −0.8 | 5.9 |
| 0.4 | 0.50 | 9.4 | 4 | 3 | 57.2 | 83.3 | −0.4 | 6.3 |
| 1.0 | 0.00 | 4.5 | 12 | 10 | 50.1 | 70.1 | −0.6 | 4.3 |
| 1.0 | 0.40 | 6.7 | 12 | 10 | 51.4 | 78.9 | −0.8 | 4.4 |
| 1.0 | 0.60 | 7.6 | 12 | 10 | 51.6 | 79.1 | −0.7 | 4.2 |
| 1.0 | 0.80 | 8.6 | 12 | 10 | 51.2 | 79.2 | −0.7 | 4.6 |

In the previous examples, the effective weight ratio of sodium bisulphite to sodium borohydride is 8:1. To investigate further the possibility of in situ hydrosulphite generation, tests were carried out in which, for a constant Borol content of 0.5%, the bisulphite content was increased to 2.3% (14:1 $HSO_3^-/BH_4^-$ ratio) and 2.6% (16:1 ratio), the NaOH content also being varied. Such an increase would be expected to assist the more efficient generation of hydrosulphite. The results are shown in Table 4.

TABLE 4

EFFECT OF BISULFITE IN A BOROL, BISULFITE, NaOH REDUCTIVE DEINKING SYSTEM

| BOROL % | BISULFITE % | NAOH % | PULPER pH | CONSIS. % | PULP TIME (min.) | BRIGHT. % ISO |
|---|---|---|---|---|---|---|
| 0.5 | 2.3 | 0.0 | 6.2 | 4 | 3 | 55.4 |
| 0.5 | 2.3 | 0.4 | 7.4 | 4 | 3 | 57.8 |
| 0.5 | 2.3 | 0.6 | 7.9 | 4 | 3 | 57.3 |
| 0.5 | 2.3 | 0.8 | 8.5 | 4 | 3 | 57.7 |
| 0.5 | 2.3 | 1.0 | 9.5 | 4 | 3 | 57.9 |
| 0.5 | 2.3 | 1.2 | 10.2 | 4 | 3 | 58.2 |
| 0.5 | 2.3 | 1.4 | 10.5 | 4 | 3 | 57.4 |
| 0.5 | 2.3 | 1.6 | 10.8 | 4 | 3 | 56.7 |
| 0.5 | 2.6 | 0.0 | 6.4 | 4 | 3 | 55.8 |
| 0.5 | 2.6 | 0.4 | 7.2 | 4 | 3 | 56.8 |
| 0.5 | 2.6 | 0.6 | 7.6 | 4 | 3 | 57.9 |
| 0.5 | 2.6 | 0.8 | 8.1 | 4 | 3 | 56.1 |
| 0.5 | 2.6 | 1.0 | 8.9 | 4 | 3 | 57.9 |
| 0.5 | 2.6 | 1.2 | 9.8 | 4 | 3 | 57.1 |
| 0.5 | 2.6 | 1.4 | 10.3 | 4 | 3 | 56.0 |
| 0.5 | 2.6 | 1.6 | 10.5 | 4 | 3 | 55.2 |

Assuming and correcting for an 85.0% conversion and based on $NaBH_4$ content only, the 0.5% Borol dose represents a potential 1.0% hydrosulphite charge. It can be seen from Table 4 that at the 14:1 ratio the brightness can be increased by about one half a point but along with the increased amount of bisulphite needed the amount of NaOH was two and a half times that needed to optimize the 8:1 ratio system. When the cost of the increased bisulphite and NaOH is considered then the best overall performance is obtained with the 8:1 ratio system.

EXAMPLE 5

Further samples of the 4% and 12% consistency pulps were de-inked under the same conditions as in the previous examples, but using Borol-generated sodium hydrosulphite (BSH) instead of Borol and bisulphite. The pulping time was 3 min. for the 4% pulp and 10 min. for the 12% pulp, which have been found to be the The results show that at low consistency and with the proper optimization of NaOH charge, the hydrosulphite de-inking system (1.0% dose) gave slightly better results (58.2% ISO vs. 57.6% ISO) than that obtained by either the Borol/bisulphite/NaOH or oxidative system. However, at medium consistency the pregenerated hydrosulphite de-inking system gave poor results. It gave a maximum brightness of 51.6% ISO compared to 54.1% ISO for the Borol/bisulphite/NaOH system and 55.5% ISO for the oxidative system.

If the synergistic effect of the 3-component system is due to in situ hydrosulphite generation, the fact that at low consistency the Borol/bisulphite/NaOH de-inking system can be made to perform equally as well as an oxidative system but at medium consistency it falls short by about 1½ brightness points of that obtained by the oxidative system may be explained by considering that at low consistency the reducing chemicals have a better chance of combining quickly and more efficiently than at medium consistency, allowing for more efficient hydrosulphite generation. It is also important to note that there was no nitrogen blanket used or any other attempt to exclude atmospheric oxygen from the system (i.e. an open pulper was used). This fact may also favour better hydrosulphite generation at the low consistency (i.e., the larger volume of water may have afforded a better shield to atmospheric oxygen than did pulping at 12.0% consistency).

EXAMPLE 6

Experiments were carried out to compare the preferred 3-component system of the invention with an optimized oxidative system and in particular to test the sensitivities of the two systems to changes in pulping time and changes in hold (retention) time before flotation. The results are shown in Table 6:

TABLE 6

| DEINK TYPE | CONSIS. % | PULPING TIME (min) | BRIGHT. % ISO | HOLD TIME (min) | TOTAL TIME (min) | BRIGHT. % ISO |
|---|---|---|---|---|---|---|
| Red | 4 | 3 | 57.6 | 27 | 30 | 55.3 |
| OX | 4 | 3 | 55.9 | 27 | 30 | 57.7 |
| RED | 12 | 10 | 54.1 | 20 | 30 | 52.9 |
| RED | 12 | 15 | 51.3 | 15 | 30 | 52.8 |
| RED | 12 | 20 | 50.5 | 0 | 20 | 50.6 |
| RED | 12 | 30 | 50.6 | 0 | 30 | 50.5 |
| OX | 12 | 10 | 55.5 | 20 | 30 | 55.2 |
| OX | 12 | 15 | 54.4 | 15 | 30 | 55.3 |
| OX | 12 | 20 | 53.7 | 0 | 20 | 53.7 |
| OX | 12 | 30 | 54.3 | 0 | 30 | 54.3 |

RED = 0.5% Borol + 1.3% Bisulfite + 0.4% NaOH
OX = 1.0% $H_2O_2$ + 1.1% NaOH + 2.5% Silicate + 0.4% DTPA In this particular example the Borol/bisulphite/NaOH de-inking system appeared to be more sensitive to pulping and holding times—that is, the de-inked pulp brightness was negatively impacted when there was a holding time after pulping and before flotation—than was the hydrogen peroxide system. Specifically, at low consistency (i.e., 4.0%) the best results for the reductive system were obtained when the pulping time was 3 minutes with no hold time before flotation, while the best results obtained for the oxidative system when the 3 minutes pulping time was combined with a 27 minute hold time before flotation.

When pulping at medium consistency (i.e., 12.0%), for both systems the brightness decreased if the pulping time was increased beyond 10 minutes. (This is probably due to the redeposition of the ink particles as pulping times increased effectively smearing the pulp until it was a dull grey.) Here again, though, if there was a hold time after pulping and before flotation, the reductively de-inked pulp lost brightness while the oxidatively de-inked pulp either gained brightness or was otherwise affected very little (i.e., minimal or no brightness loss).

To determine the extent to which the loss in brightness sustained by the reductively de-inked samples during the holding time could be recovered, the low consistency samples were subjected to Y, P and PY bleaching, as follows:

Y: 0.75% sodium hydrosulphite at initial pH 7.2

P: 3.0% hydrogen peroxide+2.0% sodium hydroxide+3.0% silicate+0.4% DTPA

PY: (i) 3.0% $H_2O_2$+2.0% NaOH+3.0% sodium silicate +0.4% DTPA
(ii) 1.0% sodium hydrosulphite at initial pH 7.2.

Figure 2:
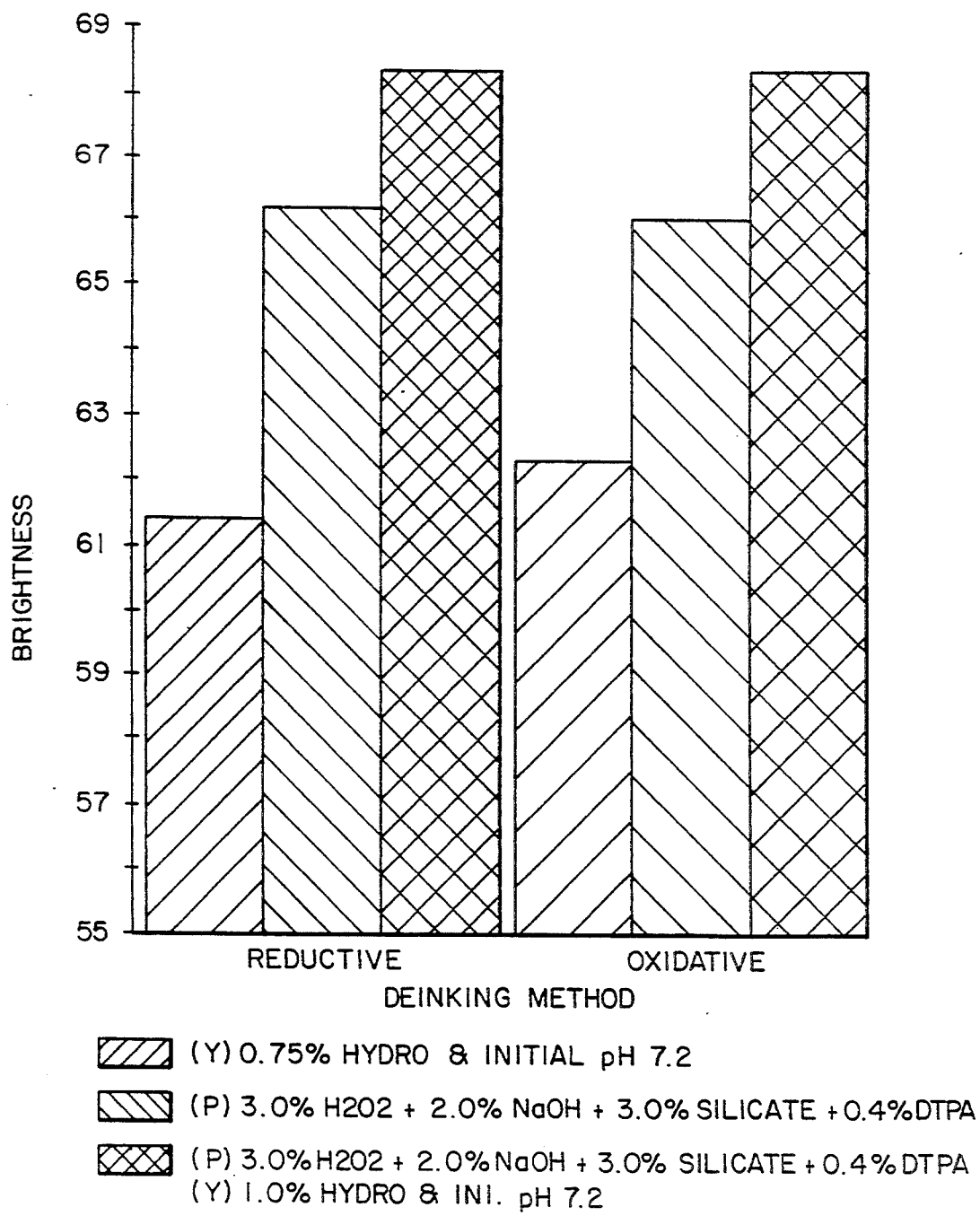
FIG. 2 is a bar chart comparing the brightness gains achieved in Example 6.

Table 7 below and FIG. 2 show the results. It emerges at this point that when pulped at low consistency, reductively and oxidatively de-inked pulps can be bleached to the same brightness (i.e., ~68.5% ISO).

TABLE 7

| DEINK METHOD | $H_2O_2$ % | NaOH % | INITIAL pH | FINAL pH | HYDRO % | INITIAL pH | FINAL pH | BR. % ISO | B | L* | a* | b* |
|---|---|---|---|---|---|---|---|---|---|---|---|---|
| RED | 0 | 0.0 | | | 0.00 | | | 57.6 | | 83.0 | −0.7 | 5.5 |
| RED | 0 | 0.0 | | | 0.75 | 6.3 | 4.6 | 61.0 | 3.4 | 84.9 | −1.1 | 5.4 |
| RED | 0 | 0.0 | | | 1.00 | 6.3 | 4.4 | 61.0 | 3.4 | 84.7 | −1.1 | 5.2 |
| RED | 0 | 0.0 | | | 0.75 | 7.2 | 5.0 | 61.4 | 3.8 | 85.2 | −1.1 | 5.7 |
| RED | 0 | 0.0 | | | 1.00 | 7.2 | 5.0 | 61.4 | 3.8 | 85.0 | −1.1 | 5.7 |
| RED | 3 | 2.0 | 11.1 | 9.8 | 0.00 | | | 66.2 | 8.6 | 87.2 | −0.9 | 4.1 |
| RED | 3 | 2.6 | 11.3 | 10.3 | 0.00 | | | 65.5 | 7.9 | 86.7 | −1.0 | 4.1 |
| RED | 3 | 2.0 | 11.1 | 9.8 | 0.75 | 6.3 | 4.9 | 68.2 | 10.6 | 88.2 | −1.2 | 4.1 |
| RED | 3 | 2.0 | 11.1 | 9.8 | 1.00 | 6.3 | 5.0 | 68.4 | 10.8 | 88.0 | −1.1 | 4.0 |
| RED | 3 | 2.0 | 11.1 | 9.8 | 1.00 | 7.2 | 5.3 | 68.2 | 10.6 | 88.1 | −1.1 | 4.0 |
| RED | 3 | 2.6 | 11.3 | 10.3 | 0.75 | 6.3 | 4.8 | 68.3 | 10.7 | 88.0 | −1.2 | 4.1 |
| RED | 3 | 2.6 | 11.3 | 10.3 | 1.00 | 6.3 | 5.2 | 68.6 | 11.0 | 88.2 | −1.2 | 4.0 |
| RED | 3 | 2.6 | 11.3 | 10.3 | 1.00 | 7.2 | 5.2 | 68.0 | 10.4 | 88.0 | −1.2 | 4.0 |
| OX | 0 | 0.0 | | | 0.00 | | | 57.7 | | 84.2 | −0.2 | 7.4 |
| OX | 0 | 0.0 | | | 0.75 | 6.3 | 4.5 | 62.1 | 4.4 | 86.1 | −1.3 | 6.6 |
| OX | 0 | 0.0 | | | 1.00 | 6.3 | 4.2 | 62.0 | 4.3 | 85.7 | −1.3 | 6.2 |
| OX | 0 | 0.0 | | | 0.75 | 7.2 | 4.9 | 62.3 | 4.6 | 86.3 | −1.3 | 6.5 |
| OX | 0 | 0.0 | | | 1.00 | 7.2 | 5.0 | 62.6 | 4.9 | 86.3 | −1.3 | 6.5 |
| OX | 3 | 2.0 | 11.3 | 10.3 | 0.00 | | | 66.0 | 8.3 | 87.4 | −1.0 | 4.6 |
| OX | 3 | 2.6 | 11.4 | 10.7 | 0.00 | | | 65.2 | 7.5 | 87.2 | −1.0 | 5.2 |
| OX | 3 | 2.0 | 11.3 | 10.3 | 0.75 | 6.3 | 4.9 | 68.1 | 10.4 | 88.4 | −1.2 | 4.6 |
| OX | 3 | 2.0 | 11.3 | 10.3 | 1.00 | 6.3 | 5.0 | 68.3 | 10.6 | 88.4 | −1.2 | 4.5 |
| OX | 3 | 2.0 | 11.3 | 10.3 | 1.00 | 7.2 | 5.2 | 68.4 | 10.7 | 88.3 | −1.3 | 4.5 |
| OX | 3 | 2.6 | 11.4 | 10.7 | 0.75 | 6.3 | 5.4 | 68.0 | 10.3 | 88.5 | −1.4 | 5.0 |
| OX | 3 | 2.6 | 11.4 | 10.7 | 1.00 | 6.3 | 5.1 | 67.9 | 10.2 | 88.3 | −1.3 | 4.8 |
| OX | 3 | 2.6 | 11.4 | 10.7 | 1.00 | 7.2 | 5.9 | 67.9 | 10.2 | 88.4 | −1.4 | 5.0 |

Figure 3:
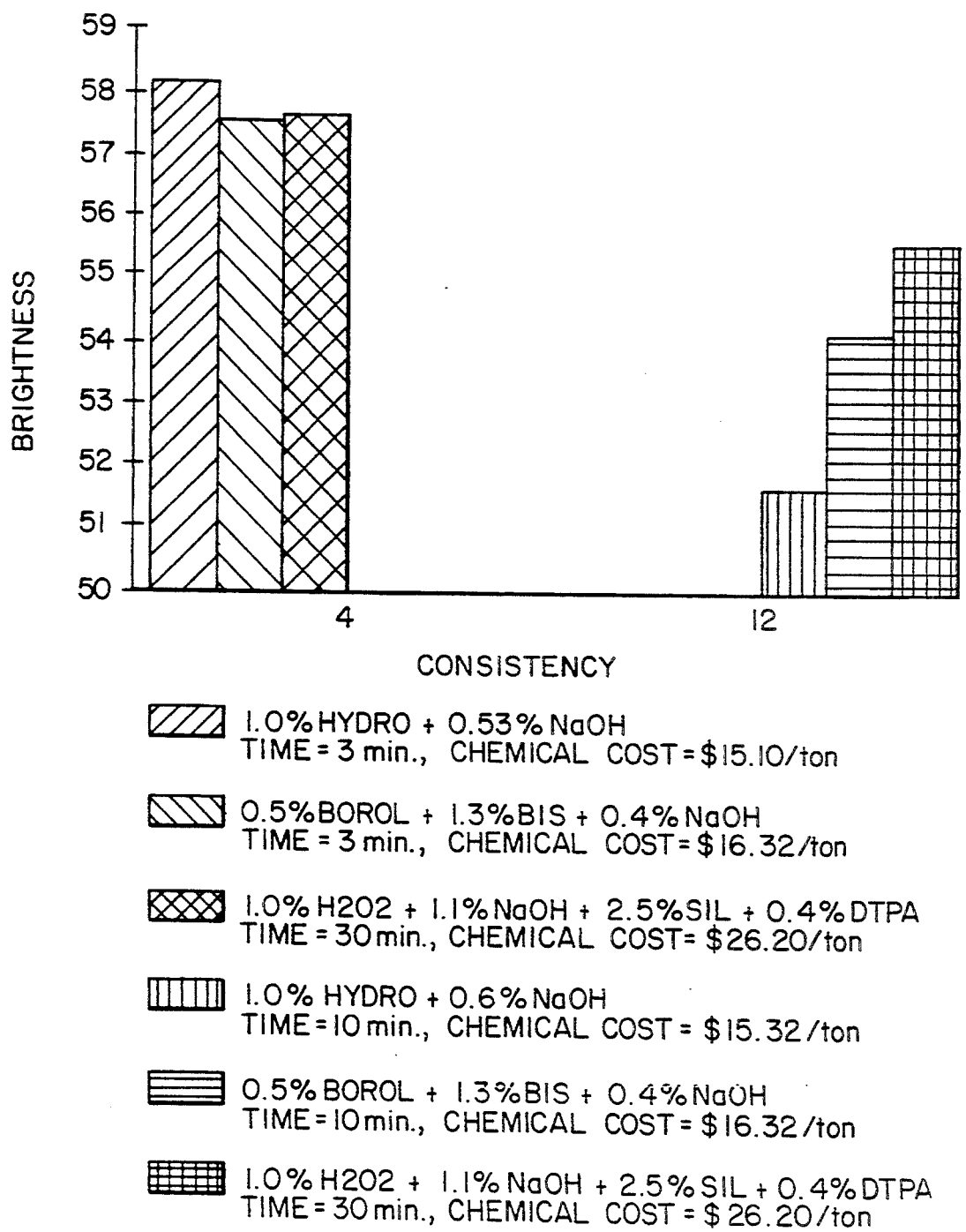
FIG. 3 is a bar chart illustrating the brightness gains achieved with different chemical changes at 4% and 12% pulp consistency.

The main findings of Examples 1 to 6 are illustrated in FIG. 3.

EXAMPLE 7

Bearing in mind the results of Example 6, in order to obtain a comprehensive data base on the bleaching of reductively de-inked pulp the following six types of de-inked pulp were prepared and bleached:

a) Reductively de-inked, pulped at 4.0% consistency, no hold time before flotation b) Reductively de-inked, pulped at 4.0% consistency, 30 minutes hold time before flotation c) Oxidatively de-inked, pulped at 4.0% consistency, 30 minutes hold time before flotation d) Reductively de-inked, pulped at 12.0% consistency, no hold time before flotation e) Reductively de-inked, pulped at 12.0% consistency, 30 minutes hold time before flotation f) Oxidatively de-inked, pulped at 12.0% consistency, 30 minutes hold time before flotation The bleach procedures were as follows:

SODIUM HYDROSULPHITE BLEACHING

Based on consistency, individual charges of 7 g oven dried pulp were placed in heavy gauge polyethylene bags. The pulp was then diluted with distilled water such that the bleaching consistency equalled 3.0%. The bags were sealed under nitrogen, shaken vigorously to disperse the pulp fibre, and preheated in a constant temperature both at 60° C. for 30 minutes.

A sodium hydrosulphite solution was generated from Borol®/caustic/$SO_2$. Ethylene diamine tetraacetic acid (EDTA) was included as a chelant. The solution was analyzed for sodium hydrosulphite by titration with a standard iodine solution (TAPPI Standard T-622). Based on the analysis, the required volume of bleach solution was then calculated.

A bleach run consisted of removing individual bags from the bath, removing the rubber band seal and directing a stream of nitrogen over the pulp. The initial pH was then measured. Each bag was sealed, shaken thoroughly to mix, reopened, and purged with nitrogen. The precalculated volume of hydrosulphite was added by pipette below the surface of the pulp. Each bag was resealed, shaken thoroughly to mix, and returned to the constant temperature bath for 60 minutes.

At the end of the bleaching period each bag was removed from the bath, shaken, opened and the pH measured. The pulp was then diluted to 1% consistency with deionized water. Handsheets (3.5 g each) were made from each run and air dried overnight at 50% relative humidity. The brightnesses were read on a Zeiss Elrepho and are reported as the average of four readings from each handsheet. The brightness pads were reverted by heating in a circulating air oven at 105° C. for one hour and the brightness remeasured.

HYDROGEN PEROXIDE BLEACHING

Peroxide bleach liquors were prepared from stock solutions of DTPA, sodium silicate, sodium hydroxide, magnesium sulphate and hydrogen peroxide. The peroxide was titrated on a daily basis with a standard sodium thiosulphate solution.

Based on consistency, individual charges of 7 g oven dried pulp were placed in heavy gauge polyethylene bags. The pulp was diluted with the bleach liquor solution and deionized water to obtain a bleaching consistency of 15.0%. The pulp was thoroughly kneaded by hand to ensure proper mixing. The initial pH was measured then the bags were sealed under nitrogen and placed in a 60° C. constant temperature bath for 120 minutes.

At the end of the bleaching period, each bag was removed from the bath and the pH of the peroxide bleached pulp determined. The pulp was then diluted with 700 mls of deionized water and soured to a pH of 5.5 with $SO_2$-$H_2O$. At this point the pulp was either filtered to a high consistency and stored for second stage hydrosulphite bleaching or handsheets were made to provide brightness values resulting from the peroxide stage.

Handsheets, (3.5 g each), from each run were air dried overnight at 50% relative humidity. The brightnesses were read on a Zeiss Elrepho and were reported as the average of four readings from each handsheet. The brightness pads were reverted by heating in a circulating air oven at 105° C. for one hour and the brightness remeasured.

A series of trials was carried out to establish the optimum bleaching conditions, which were found to be as follows:

HYDROSULPHITE BLEACHING pH Optimization

The optimum pH for reductively or oxidatively de-inked pulp was in the range of 6.5–7.5 at 1.0% hydro dose.

EDTA Optimization

The optimum chelant (EDTA) dose for reductively or oxidatively de-inked pulp was 3 lbs/ton (0.15%) at 1.0% hydro, resulting in an increase of ~1.0 brightness point as compared to a 1.0% hydro dose without chelant.

Hydrosulphite Response at Optimum Conditions

The optimum hydrosulphite dose was between 075 to 1.25%. All pulps bleached benefited (i.e., ~1.0 brightness point gain) by the addition of 0.15% EDTA.

PEROXIDE BLEACHING

Alkalinity Optimization

For 1.0 and 2.0% peroxide the optimum NaOH to peroxide ratio was 1.0 for all pulps. For 3.0% peroxide bleaching the optimum NaOH to peroxide ratio was 0.85 for all pulps.

TWO STAGE PEROXIDE-HYDROSULPHITE BLEACHING (PY) (PY) Response

The best results obtained for all pulps was at 3.0% peroxide followed by 0.5 to 1.0% hydrosulphite.

The pulp used in this example, although from similar sources, was different from that of the previous examples. This furnish did not seem to be as sensitive (in terms of de-inked pulp brightness) to holding times for reductive de-inking as was the previously used furnish. As a result the bleached brightnesses of reductively de-inked pulps with a holding time were extremely close (i.e. within 1.0 brightness point) to that obtained for reductive de-inking with no hold time. This suggests that reductive de-inking is not inherently more sensitive to holding times but may or may not be so depending on the fibre source.

The results obtained in this example using the optimum conditions set out above are summarized in Tables 8a to 8c:

TABLE 8a (HYDROSULPHITE BLEACHING)

| DEINK. METHOD | DEINK. CONSIS. (%) | HOLD TIME (min) | HYDRO (%) | EDTA (%) | INITIAL pH | BRIGHT (% ISO) | BRIGHT GAIN | YELLOW-BLUE (b*) |
|---|---|---|---|---|---|---|---|---|
| RED | 4.0 | 0 | 1.00 | 0.15 | 7.0 | 62.5 | 5.2 | 5.5 |
| RED | 4.0 | 30 | 1.25 | 0.15 | 7.0 | 62.6 | 5.9 | 5.9 |
| OX | 4.0 | 30 | 1.25 | 0.15 | 7.0 | 62.5 | 5.6 | 5.9 |
| RED | 12.0 | 0 | 0.75 | 0.15 | 7.0 | 56.8 | 4.6 | 5.0 |
| RED | 12.0 | 30 | 0.75 | 0.15 | 7.0 | 55.9 | 4.0 | 4.9 |
| OX | 12.0 | 30 | 0.75 | 0.15 | 7.0 | 59.0 | 3.5 | 5.2 |

TABLE 8b (PEROXIDE BLEACHING)

| DEINK. METHOD | DEINK. CONSIS. (%) | HOLD TIME (min) | PEROX. (%) | NaOH $H_2O_2$ | BRIGHT (% ISO) | BRIGHT GAIN | YELLOW-BLUE (b*) |
|---|---|---|---|---|---|---|---|
| RED | 4.0 | 0 | 3.0 | 0.85 | 67.0 | 9.2 | 4.6 |
| RED | 4.0 | 30 | 3.0 | 0.85 | 66.6 | 9.1 | 4.4 |
| OX | 4.0 | 30 | 3.0 | 0.85 | 65.5 | 7.3 | 5.5 |
| RED | 12.0 | 0 | 3.0 | 0.85 | 58.6 | 6.4 | 3.6 |
| RED | 12.0 | 30 | 3.0 | 0.85 | 59.3 | 7.4 | 3.2 |
| OX | 12.0 | 30 | 3.0 | 0.85 | 59.4 | 3.9 | 3.0 |

TABLE 8c (PY BLEACHING)

| DEINK. METHOD | DEINK. CONSIS. (%) | HOLD TIME (min) | PEROX. (%) | HYDRO (%) | BRIGHT (% ISO) | BRIGHT GAIN | YELLOW-BLUE (b*) |
|---|---|---|---|---|---|---|---|
| RED | 4.0 | 0 | 3.0 | 0.5 | 70.0 | 12.2 | 4.2 |
| RED | 4.0 | 30 | 3.0 | 0.75 | 69.3 | 11.8 | 4.0 |
| OX | 4.0 | 30 | 3.0 | 0.50 | 68.3 | 11.1 | 5.5 |
| RED | 12.0 | 0 | 3.0 | 1.0 | 61.1 | 8.9 | 4.1 |
| RED | 12.0 | 30 | 3.o | 0.5 | 62.1 | 10.2 | 3.9 |
| OX | 12.0 | 30 | 3.0 | 0.5 | 63.1 | 7.6 | 3.7 |

Figure 4:
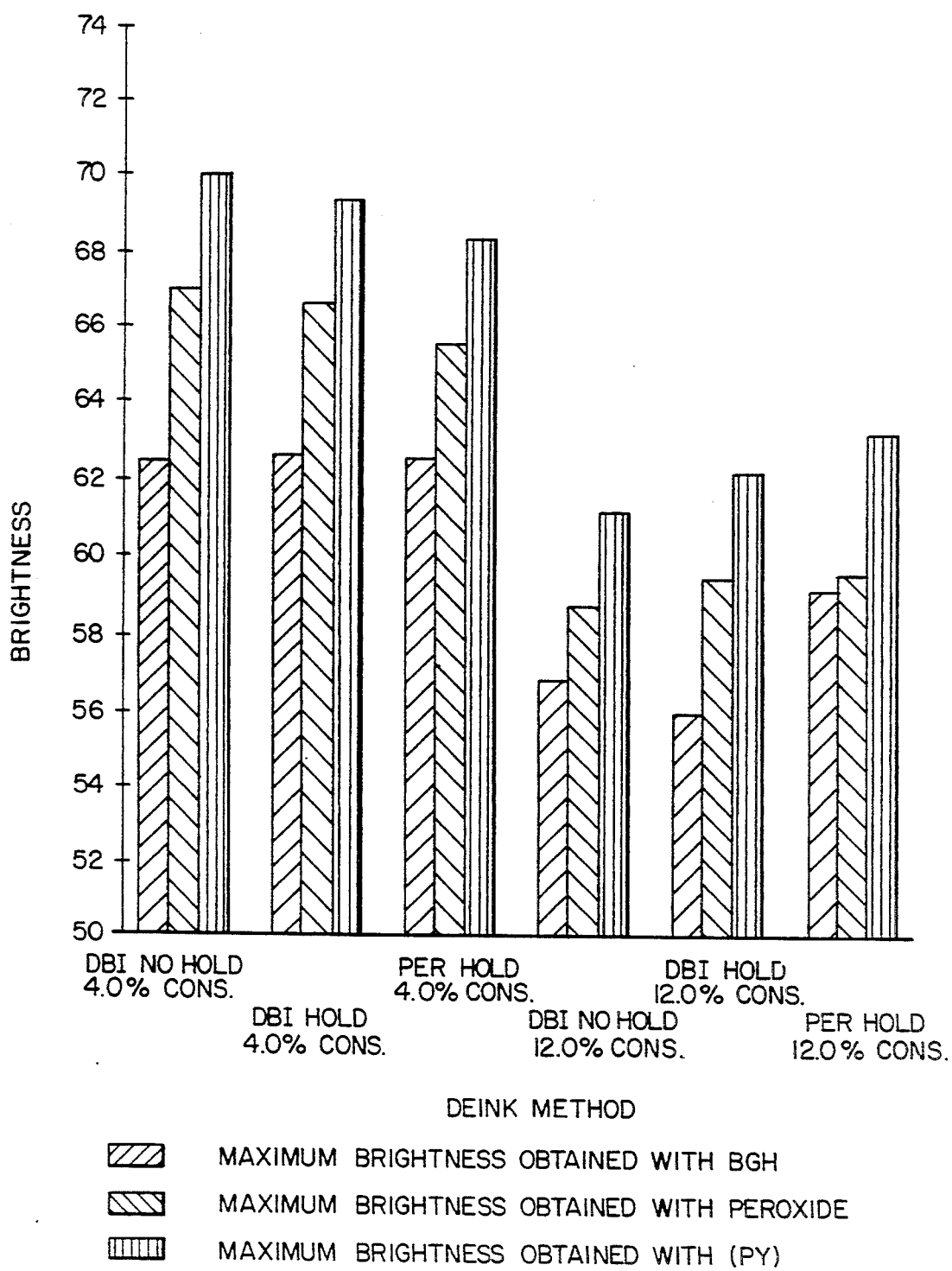
FIG. 4 is a bar chart comparing the brightness gains, after bleaching, with a conventional deinking method and that of the invention.

The brightness obtained with each sample is illustrated in FIG. 4, wherein the abbreviation DBI (direct Borol injection) refers to the de-inking method rather than to the bleaching method, 'PER' indicates peroxide de-inking and 'BGH' means Borol-generated hydrosulphite.

Although no specific confidence levels were determined in this study, a simple statement about reproducibility is warranted. Firstly, all runs were conducted in duplicate and, when needed to eliminate "data spikes", in triplicate. Secondly, the optimum chemical charges for both reductive and oxidatively de-inked pulp were repeated 8 times. The 0.5% Borol/1.3% bisulphite/0.4 NaOH had a range of 1.9 brightness points. The 1.0% $H_2O_2$/1.1% NaOH/2.5% silicate/0.4% DTPA had a range of 1.3 brightness points.

Overall the data proved to be reproducible within what one would expect when dealing with a varying fibre furnish (i.e. recycled wastepaper and magazines).

To sum up, the most satisfactory overall results for the reductive de-inking of recycled pulp have been obtained with a combination of 0.5% Borol, 1.3% sodium bisulphite and 0.4% NaOH. At low pulp consistency this combination compares well with the best oxidative processes, which are much more expensive, and even at medium consistency the brightness obtainable is only about 1½ ISO points short of that obtainable by oxidative deinking.

Still better results can be obtained by using higher amounts of the three reagents, or by increasing the bisulphite/borohydride ratio, although in most cases this is less attractive for economic reasons. The best results at low consistency, though not at medium consistency, are obtainable using 1% sodium hydrosulphite and NaOH.

When pulped at 4.0% consistency, (P), (Y) or (PY) bleaching of reductively de-inked pulp results in absolute brightnesses that are within no more than ±2.0 brightness points of that obtained for oxidatively de-inked pulp.

When pulped at 12.0% consistency, the lower brightnesses of both reductively and oxidatively de-inked pulp can not be bleached to that obtained with 4.0% consistency pulped pulp; but (P), (Y) and (PY) bleaching of reductively de-inked pulp results in absolute brightnesses that are no more than ±2.0 brightness points of that obtained for oxidatively de-inked pulp.

The optimum chemical dosages are essentially identical for bleaching either oxidatively or reductively de-inked pulp.

Bleached reductively de-inked pulp tends to either be whiter (i.e., lower b* values) or as white as bleached oxidatively de-inked pulp.

The reduced yellow-blue (b*) axis values obtainable with the reductive process, giving whiter pulp of either consistency than with oxidative de-inking, is probably due to the lower pulping pH and hence lower total alkalinity required for optimal performance of reductive de-inking versus that of oxidative de-inking (i.e., pulping pH=~8.5 for reductive vs. pulping pH=~10.8 for oxidative).

In general, results obtained for (Y), (P) or (PY) bleaching of reductively de-inked pulp are not significantly different from that obtained for bleaching oxidatively de-inked pulp.

What is claimed is:

1. A process for reductive de-inking wood-containing recycled paper consisting essentially of pulping the recycled paper in an open pulper in the presence of an aqueous de-inking composition consisting essentially of an alkali metal hydroxide, flotation agent, and a reducing agent selected from the group consisting of sodium hydrosulfite and mixtures of sodium borohydride and sodium bisulfite, wherein said de-inking composition is added immediately upon the onset of pulping at a pH of from 7 to about 8.5, and immediately and with no hold time after pulping the dislodged inks are removed by screening, flotation and/or washing stages, and then optionally subjecting the de-inked pulp to a bleaching step.

2. A process as claimed in claim 1 wherein the alkali metal hydroxide is sodium hydroxide.

3. A process as claimed in claim 1 wherein the reducing agent is a mixture of sodium borohydride and sodium bisulfite.

4. A process as claimed in claim 3 wherein the sodium borohydride is present in the de-inking composition in an amount of about 0.035 to about 0.1 weight percent.

5. A process as claimed in claim 3 wherein the sodium bisulfite and sodium borohydride are present at a weight ratio of $NaHSO_3:NaBH_4$ in the range from about 6:1 to about 16:1.

6. A process as claimed in claim 5 wherein the deinking composition is made up by combining, in water, about 0.7 to 2 percent $NaHSO_3$, about 0.2 to 0.7 percent NaOH and about 0.3 to 0.8 percent of a solution of about 12% $NaBH_4$, about 40% NaOH and about 48% water.

7. A process as claimed in claim 1 wherein the reducing agent is about 0.4 to about 1.0 weight percent of sodium hydrosulfite.

8. A process as claimed in claim 1 wherein the pulping is carried out at a pulp consistency from about 2 to about 15%.

9. A process as claimed in claim 1 which is carried out at a temperature of from about 25° to about 75° C.

* * * * *